US008961295B2

(12) United States Patent
Bleich et al.

(10) Patent No.: US 8,961,295 B2
(45) **Date of Patent: *Feb. 24, 2015**

(54) POWER CONSERVATION IN WAGERING GAME MACHINES

(71) Applicant: WMS Gaming Inc., Waukegan, IL (US)

(72) Inventors: Charles R. Bleich, Cary, IL (US); Michael J. Sosnoski, Round Lake Beach, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/278,116

(22) Filed: May 15, 2014

(65) Prior Publication Data

US 2014/0302912 A1 Oct. 9, 2014

Related U.S. Application Data

(63) Continuation of application No. 12/514,435, filed as application No. PCT/US2007/023756 on Nov. 9, 2007, now Pat. No. 8,753,192.

(60) Provisional application No. 60/865,430, filed on Nov. 11, 2006.

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *G07F 17/32* | (2006.01) |

(52) U.S. Cl.

CPC ............ *G07F 17/3216* (2013.01); *G07F 17/32* (2013.01)

USPC ................... 463/24; 463/25; 463/26; 463/27; 463/28; 463/29; 463/40; 463/41; 463/42; 463/43; 273/292; 307/149

(58) Field of Classification Search

USPC ........................ 273/292; 463/24-43; 307/149

See application file for complete search history.

(56) References Cited

U.S. PATENT DOCUMENTS 8,753,192 B2 * 6/2014 Bleich et al. .................... 463/24

* cited by examiner

*Primary Examiner* — Adetokunbo O Torimiro

(74) *Attorney, Agent, or Firm* — Nixon Peabody LLP

(57) ABSTRACT

Systems and methods provide power management on a wagering game machine. Inrush power may be reduced by staggering application of power to various power supplies in a wagering game machine. A processor or timer may control the activation of power supplies. Further power management may be provided by placing wagering game machine peripherals in a power consumption mode appropriate to the activity or lack of activity on a wagering game machine.

18 Claims, 6 Drawing Sheets

POWER CONSERVATION IN WAGERING GAME MACHINES

RELATED APPLICATIONS

This patent application is a continuation of U.S. Ser. No. 12/514,435, filed Apr. 14, 2010, which is a U.S. National Stage Filing under 35 U.S.C. 371 from International Patent Application Serial No. PCT/US2007/023756, filed Nov. 9, 2007, and published on May 22, 2008, as WO 2008/060514 A2 and republished as WO 2008/060514 A3, which claims the priority benefit of U.S. Provisional Patent Application Ser. No. 60/865,430, filed Nov. 11, 2006 and entitled "POWER CONSERVATION IN WAGERING GAME MACHINES", which are all incorporated herein by reference.

FIELD

The embodiments relate generally to wagering game machines and more particularly to power conservation in wagering game machines.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright© 2006, WMS Gaming Inc.

BACKGROUND

Wagering games are very popular in many parts of the world. A gaming establishment may operate hundreds, thousands or ten of thousands of wagering game machines. Each of these gaming machines and their associated peripherals consume power and generate heat. As a result, operating costs associated with providing power to wagering game machines can be high.

Furthermore, it is often the case that the power supplies in a gaming machine or in multiple gaming machines may be allowed to be powered on at the same time. The respective inrush currents for each power supply add together creating excessive inrush current. This inrush current may cause a fuse or circuit breaker in the wagering game machine or in a gaming establishment to trip.

DETAILED DESCRIPTION

Figure 1:
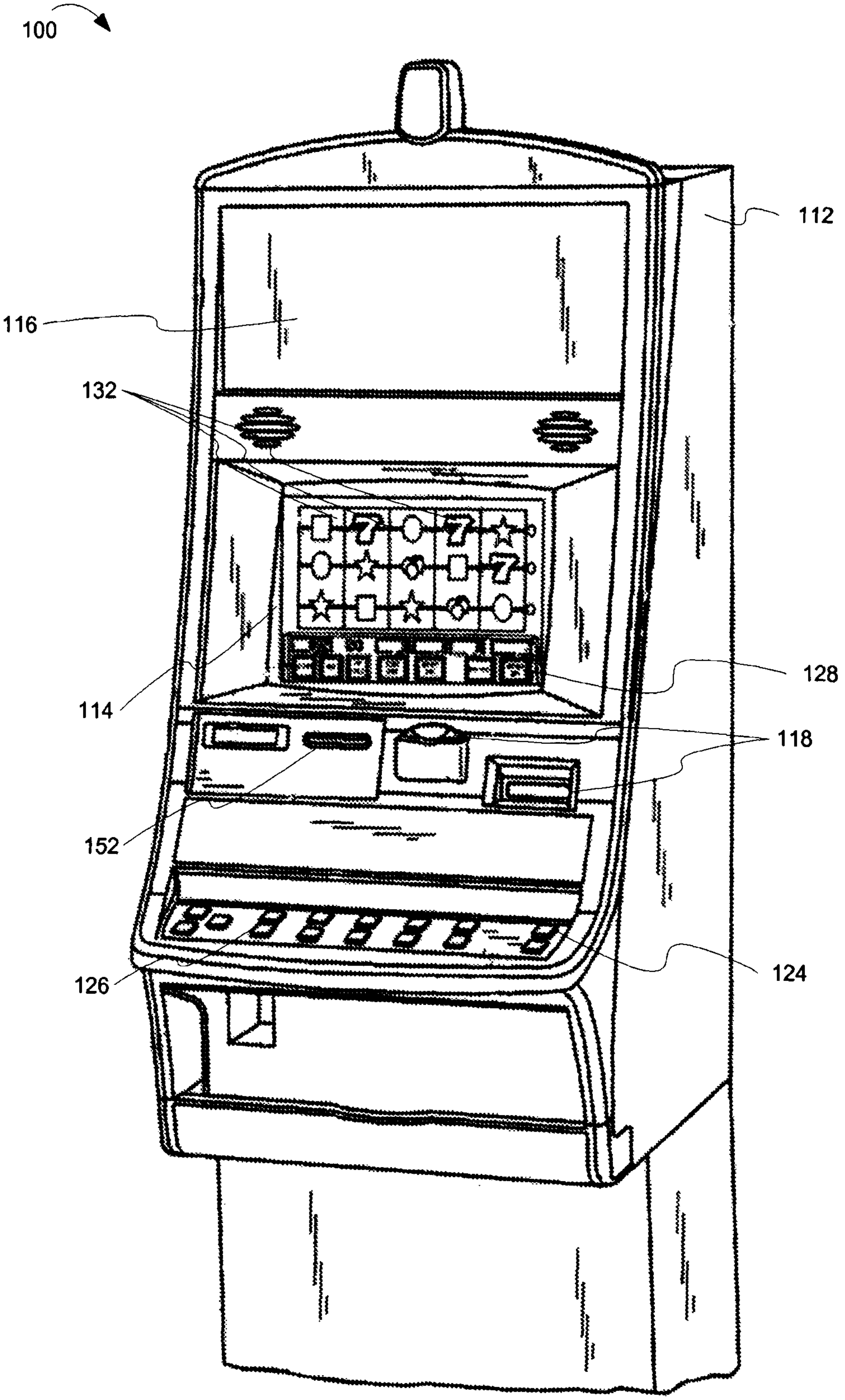
FIG. 1 is a perspective view of a wagering game machine according to an example embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

Example Wagering Game Machine

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

Figure 2:
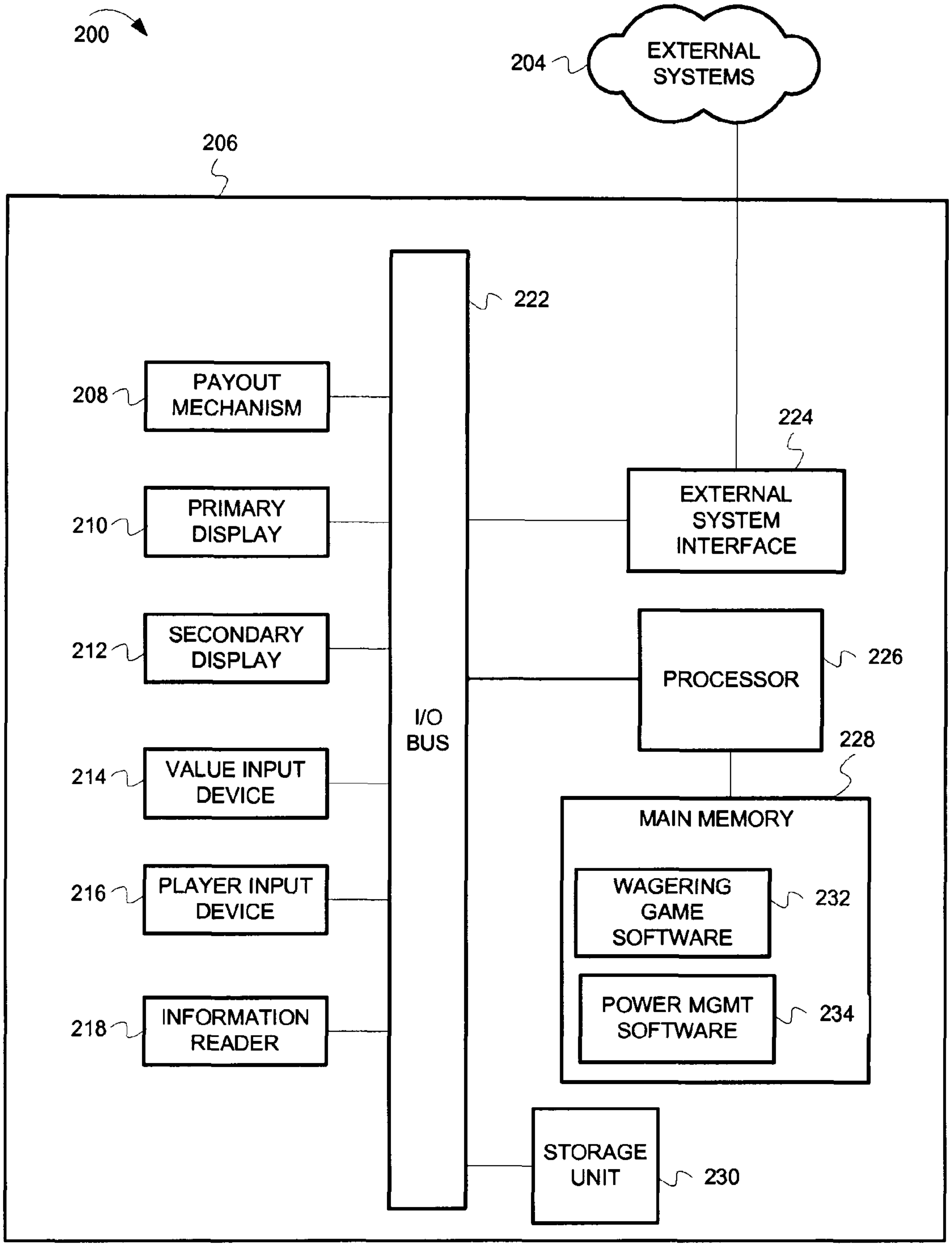
FIG. 2 is a block diagram of processing components of a wagering game machine, including a control system, according to an example embodiment.

FIG. 2 is a block diagram illustrating a wagering game machine architecture, including a control system, according to example embodiments of the invention. As shown in FIG. 2, the wagering game machine 206 includes a central processing unit (CPU) 226 connected to main memory 228, which includes a wagering game presentation unit 232. In one embodiment, the wagering game presentation unit 232 can present wagering games, such as video poker, video black jack, video slots, video lottery, etc., in whole or part.

The CPU 226 is also connected to an input/output (I/O) bus 222, which facilitates communication between the wagering game machine's components. The I/O bus 222 is connected to a payout mechanism 208, primary display 210, secondary display 212, value input device 214, player input device 216, information reader 218, and storage unit 230. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and multiple CPUs 226. In one embodiment, any of the components can be integrated or subdivided. Additionally, in one embodiment, the components of the wagering game machine 206 can be interconnected according to any suitable interconnection architecture (e.g., directly connected, hypercube, etc.).

In one embodiment, any of the components of the wagering game machine 206 can include hardware, firmware, and/or software for performing the operations described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 3A:
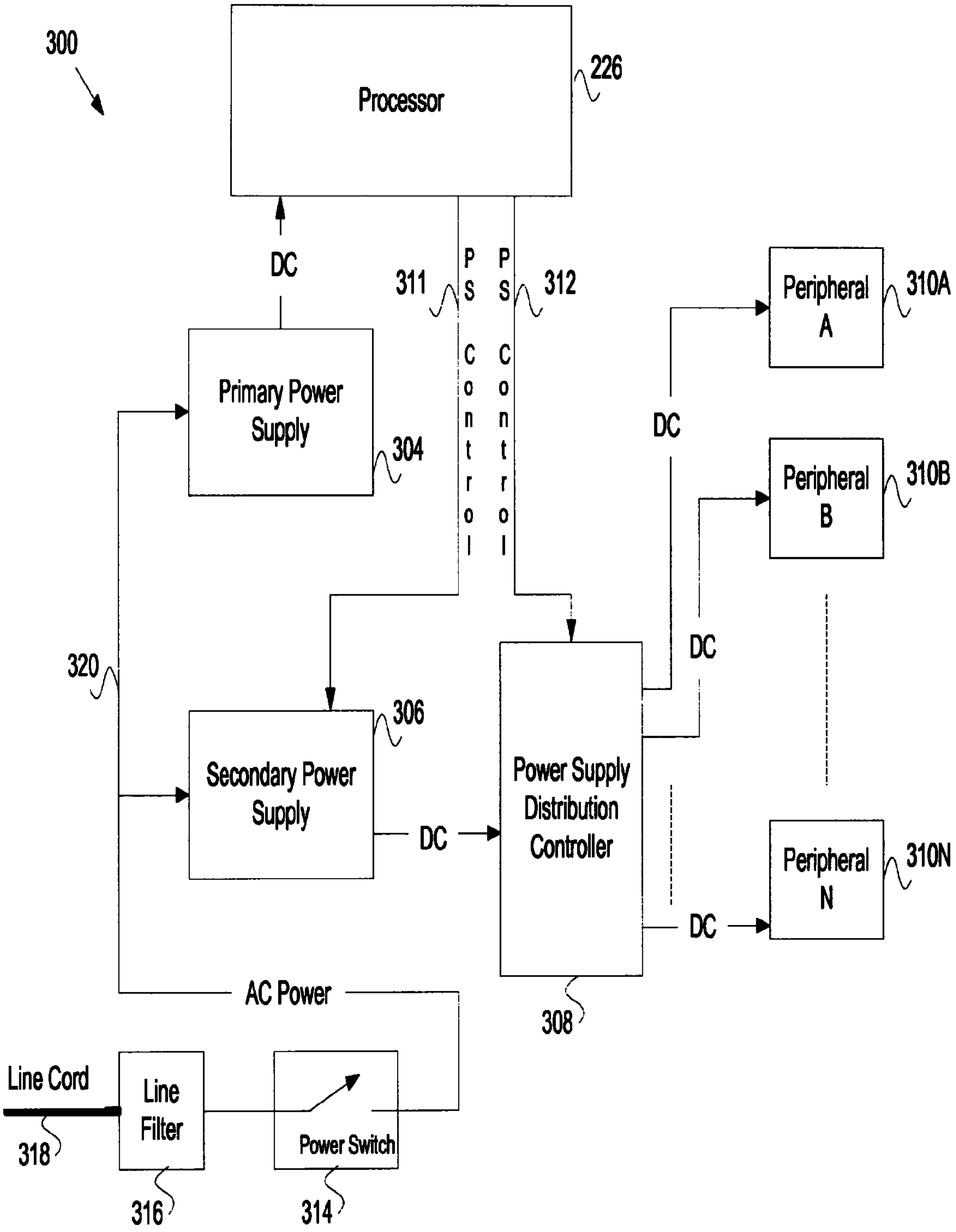
FIGS. 3A-3D are block diagrams illustrating components of power control architectures for a wagering game machine according to example embodiments.

FIG. 3A is a block diagram illustrating components of a power control architecture 300 for a wagering game machine according to an example embodiment. In some embodiments, architecture 300 includes processor 226, a primary power supply 304, a secondary power supply 306, a power supply distribution controller 308 and peripherals 310A-310N. Peripherals 310A-310N may be any type of peripheral found in a wagering game machine, including payout mechanism 208, primary display 210, secondary display 212, value input device 214, player input device 216, information reader 218 and/or storage unit 230. In particular, the peripherals may include ticket printers, coin hoppers, bill validators, coin acceptors, reel controllers or any other peripheral that may be found in a wagering game machine.

A line cord 318 provides AC (Alternating Current) power from a gaming establishment to the wagering game machine. In some embodiments, a line filter 316 filters unwanted RF from entering or leaving the wagering game machine through the line cord 318. Power switch 314 provides a mechanism for manually turning the wagering game machine on or off.

AC power distribution 320 distributes AC power to primary power supply 304 and secondary power supply 306. In addition, AC power distribution 320 may provide AC power to other devices that utilize AC power.

Primary power supply 304 provides converts incoming AC power to DC (Direct Current) power and provides the DC power to processor 226. In some embodiments, primary power supply 304 may provide power to a subset of the peripherals and device in a wagering game machine.

Secondary power supply 306 converts incoming AC power to DC power for use by peripherals 310A-310N. In some embodiments, peripherals 310A-310N may be directly coupled to secondary power supply 306. In alternative embodiments, secondary power supply 306 provides DC power to power supply distribution controller 308, which in turn provides the DC power to peripherals 310A-310N. Besides distributing, it is also controlling In addition to providing power to peripherals 310A-310N, power supply distribution controller 308 controls power provided to peripherals 310A-310N. Thus in some embodiments, by controlling the power to the peripherals, the devices are actually powered down and not just in a 'stand-by' mode. This is desirable because it reduces power and heat generated by the wagering game machine.

In operation, when the wagering game machine is turned on via switch 314, primary power supply 304 provides DC power to processor 226. When processor 226 reaches an appropriate state (e.g. the processor is running and its own heath is good), processor 226 signals secondary power supply 308 to become active and start supplying power to peripherals 310A-310N. Because secondary power supply 308 is not activated until after receiving a signal from processor 226, in some embodiments there is less inrush power when the wagering game machine is turned on. Further, the delay in providing power through the secondary power supply 306 may be desirable because peripherals 310A-310N are completely inactive until processor 226 is configured and I/O lines have been initialized to an appropriate state.

Figure 3B:
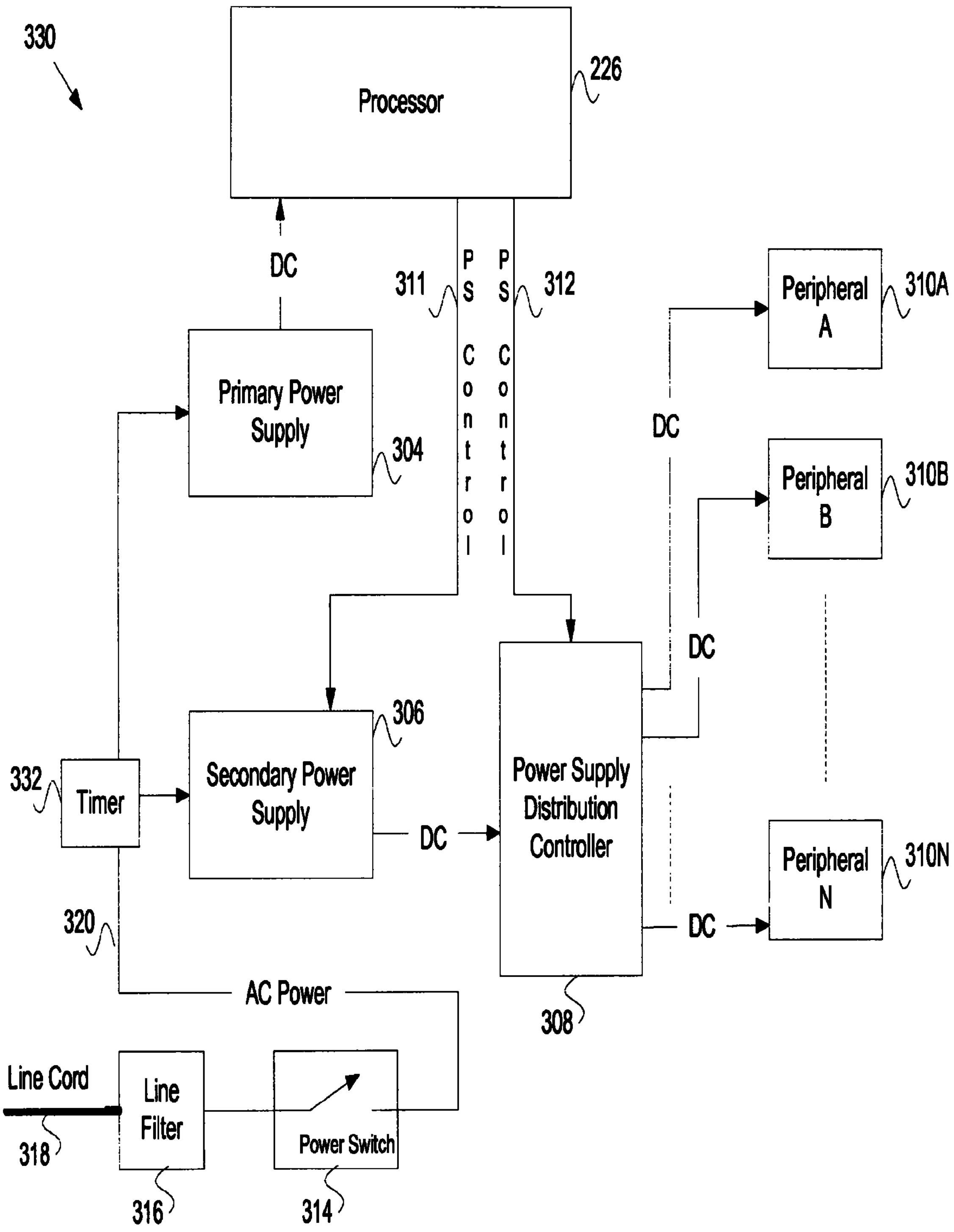

FIG. 3B is a block diagram illustrating components of a power control architecture 330 for a wagering game machine according to an example embodiment. Power control architecture 330 is similar to architecture 300, and in addition includes a timer 332. Timer 332 may be used to cause a delay in activating primary power supply 306 or secondary power supply 308 in order to reduce the inrush power for a wagering game machine. Timer 332 may be used instead of, or in addition to, having processor 226 supply a control signal to secondary power supply 306 or power supply distribution controller 308

Figure 3C:
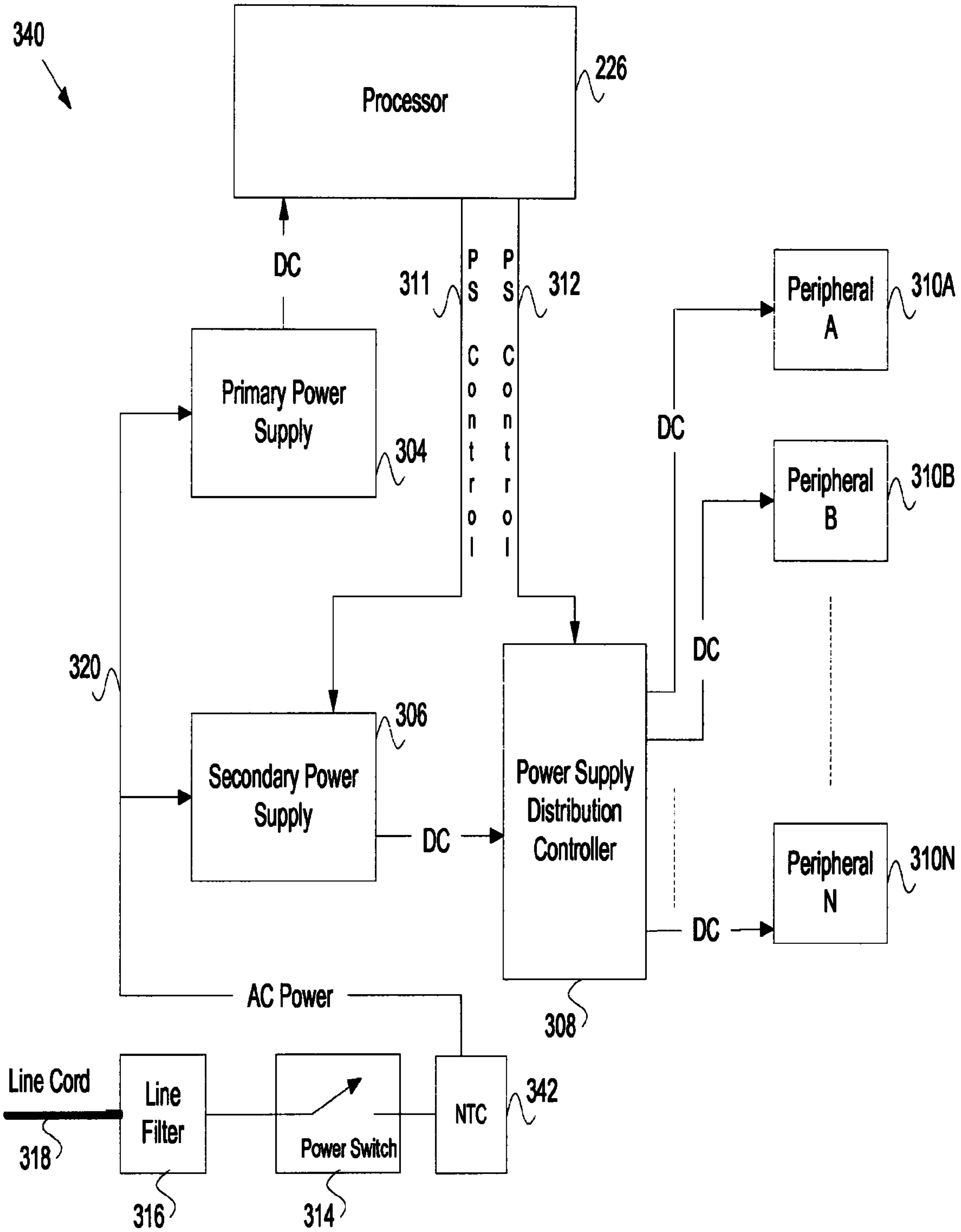

FIG. 3C is a block diagram illustrating components of a power control architecture 340 for a wagering game machine according to an example embodiment. Power control architecture 340 is similar to architecture 300, and in addition includes a negative temperature coefficient thermistor (NTC) 342. NTC 342 has high resistance when cold and the resistance reduces with heat. The normal operating current flowing through the NTC 342 causes it to heat up such that the resistance reduces to a low level that does not interfere with normal operation of the wagering game machine.

Figure 3D:
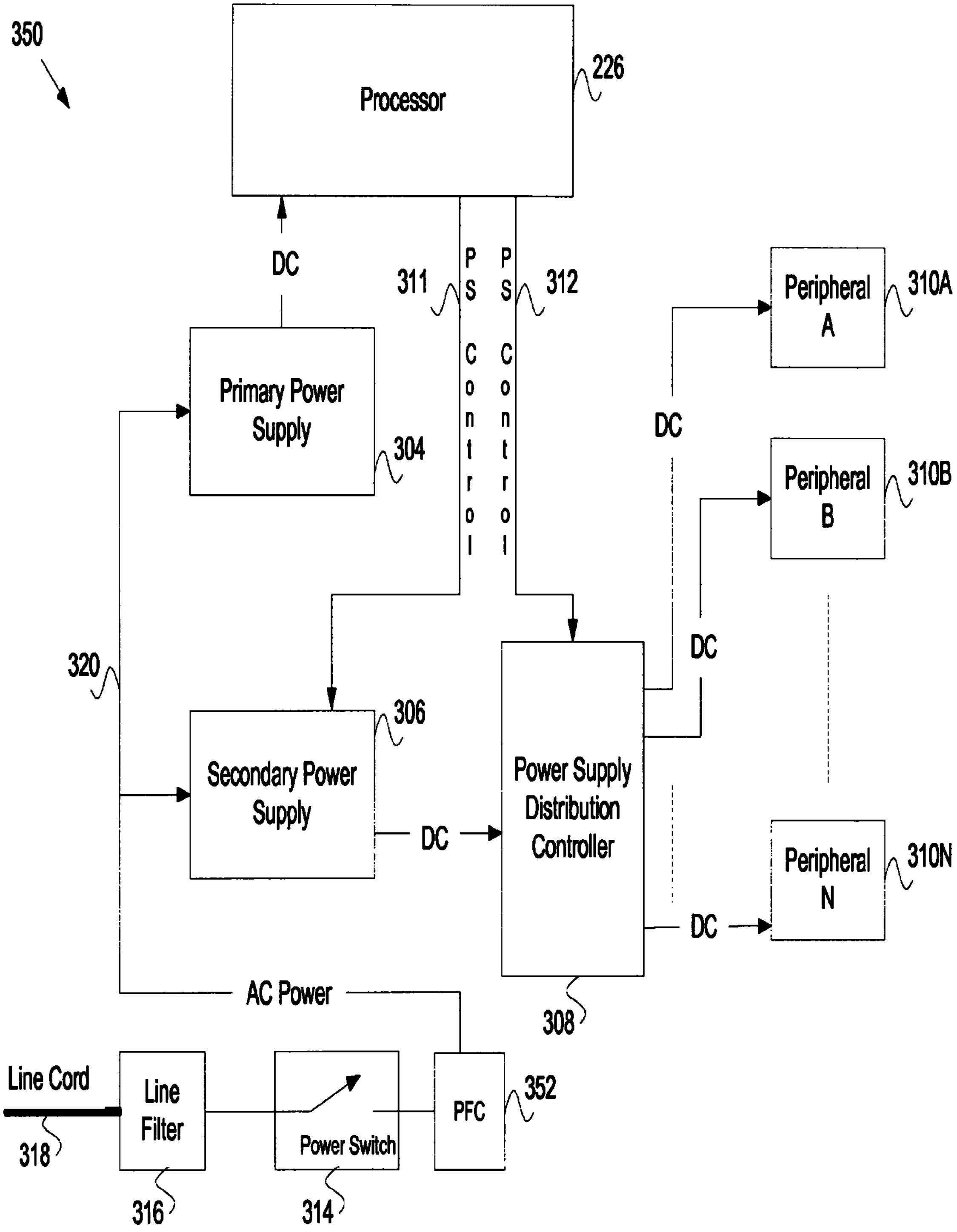

FIG. 3D is a block diagram illustrating components of a power control architecture 350 for a wagering game machine according to an example embodiment. Power control architecture 350 is similar to architecture 300, and in addition includes a power factor correction (PFC) module 352. PFC modules 352 operates to remove harmonics from the input current that may result from the operation of power supplies 304 and 306. In some embodiments, PFC module 352 is a filter that passes current only at the frequency of the voltage (e.g. 50 or 60 Hz). This filter kills the harmonic current, causing the wagering game machine to appear as a linear load to the power provider.

In alternative embodiments, PFC 352 may be implemented within power supplies 304 and 306 as a boost converter. The boost converter attempts to maintain a constant DC bus voltage on its output while drawing a current that is always in phase with and at the same frequency as the line voltage. Another switch mode converter inside the power supply produces the desired output voltage from the DC bus.

In the embodiments described in FIGS. 3A-3D, a single secondary power supply has been shown. It should be noted that the systems and methods described above are not limited to a single secondary power supply, and that in alternative embodiments, a system may have more than one secondary power supply. Thus in some embodiments, the processor 226 may send signals to activate secondary power supplies together as a group, or may send signals designed to stagger the activation of the secondary power supplies. Similarly, in embodiments using a timer, the timer may activate the secondary power supplies as a group or may stagger the activation of the secondary power supplies.

The discussion above has generally been involved with the initial power-on activities of a wagering game machine. Power management functions may also take place on an ongoing basis after the wagering game machine is powered on. For example, peripherals such as a ticket printer, bill validator, coin hopper may be capable of multiple power consumption modes, including an operation mode and a quiescent or stand-by mode. Operation consumes the most power, while stand-by mode may use little or no power. Thus the peripherals may be placed in a power consumption mode that appropriate to the way the wagering game machine is currently being used. For example, if the wagering game machine is in an idle mode, some peripherals such as a ticket printer or coin hopper may be powered down completely. Other peripherals, such as a bill acceptor, coin acceptor, player tracking and switch inputs may be maintained in a stand-by power consumption mode until the wagering game machine enters an active state for play. Additionally, some peripherals such as a coin hopper or ticket printer do not require power until a payout has been requested.

The level of wake-up can be controlled by processor 226. For example, if a switch is activated, then only the switch illumination may be powered-up. Once a play is initiated on the wagering game machine, other peripherals can be powered-up as needed. For example, the coin hopper does not need to power-up until a pay-out is required or requested. Further, the printer does not need to power-up until a pay-out is required or requested.

In some embodiments, control of the power consumption state may be provided by the processor 226. That is, the processor sends signals or data to the peripheral that indicate the power consumption state for the peripheral. In alternative embodiments, the peripheral itself may determine which power consumption state is appropriate. For example, a peripheral may enter a stand-by state if there has been no activity to the peripheral for a predetermined amount of time. If a signal or data is received by the peripheral, it may then bring itself into an operational power consumption state.

Additionally, in some embodiments, some peripherals may not be capable of operating in a stand-by power consumption mode, but may be capable of being completely powered off until needed. In these embodiments, processor 226 may send a signal to power supply distribution controller 308 indicating that a particular peripheral may be powered off. Later, if the peripheral is needed, the processor 226 may send a signal to power supply distribution controller 308 indicating that power should be supplied to the peripheral.

The following is a non-exclusive list of events that may trigger a change in a power consumption mode:

- Inactivity In some embodiments, an inactivity timer indicating that the wagering game machine has not been in use may trigger power reduction activity.
- Activity on a component—Pressing a button, touching the screen, inserting a card in a card reader receiving data over a network or phone line etc. may all cause power to be restored on previously idled components.
- Credit level—If a sufficient number of credits are already available, the credit detection devices such as card readers or ticket readers may be powered down on the assumption that they are not necessary until the credit level has decreased to a point where more credit may need to be purchased.
- Door open—Lower power to wagering game components because it unlikely that a player is using the wagering game machine when a door or cover on the wagering game machine is open.
- Transition to play mode—Lower power to diagnostic equipment in the wagering game machine that is not used when the wagering game is in its normal play mode.
- Transition to Attract Mode—Lower power to input devices such as touch screen, button panel, card reader, ticket reader etc., and increase power to output devices such as displays and audio devices as the wagering game machine is attempting to attract users.
- Transition From Attract Mode to Play Mode—Increase/apply power to input devices such as touch screen, button panel, card reader, ticket reader etc., because the devices may be used during wagering game play, and reduce power to output devices such as displays and audio devices as the wagering game machine no longer needs to attract a player.
- Proximity detection—restore power when a player occupies a chair associated with the wagering game machine.

Conclusion

Systems and methods for conserving power on a wagering game machine have been described. Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that the inventive subject matter be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. An apparatus comprising:

a power distribution source;

a primary power supply coupled to the power distribution source, the primary power source providing power to a processor for a wagering game machine, the processor presenting a wagering game upon which monetary value may be wagered;

a secondary power supply coupled to the power distribution source;

a plurality of peripherals for the wagering game machine; and wherein upon receipt of a first control signal, the secondary power supply provides power to at least one of plurality of peripherals in an operation mode, and upon receipt of a second control signal while the primary power supply provides power to the processor, the secondary power supply is controlled to power down the at least one of the plurality of peripherals.

2. The apparatus of claim 1, further comprising a power supply distribution controller coupled between the plurality of peripherals and the secondary power supply, wherein the power supply distribution controller is controlled by the processor to provide the first and second control signals.

3. The apparatus of claim 1, wherein the one secondary power supply is coupled to the processor, and the first and second control signals are sent by the processor.

4. The apparatus of claim 1, wherein the first and second control signals are sent by the at least one of the plurality of peripherals.

5. The apparatus of claim 1, wherein the second control signal is transmitted based on inactivity of the at least one of the plurality of peripherals for a predetermined amount of time.

6. The apparatus of claim 1, wherein the second control signal is transmitted based on the occurrence of an event selected from the group consisting of: inactivity timeout, component activity, time based event, credit level threshold, mode transition to play mode, mode transition to attract mode and mode transition to diagnostic mode.

7. The apparatus of claim 1, wherein the plurality of peripherals includes another peripheral, wherein upon receipt of a third control signal staggered in time from the first control signal, the secondary power supply provides power to the another peripheral in an operational mode.

8. The apparatus of claim 1, wherein upon receipt of a third control signal, the secondary power supply provides power to at least one of the plurality of peripherals in a stand-by mode.

9. The apparatus of claim 8, wherein the third control signal is transmitted based on a predetermined operation of the wagering game machine.

10. An apparatus comprising:

a power distribution source;

a primary power supply coupled to the power distribution source to provide power to a processor for a wagering game machine, the processor presenting a wagering game upon which monetary value maybe wagered;

a secondary power supply coupled to the power distribution source;

a power supply distribution controller receiving power from the secondary power supply, the power supply distribution controller communicably coupled to the processor;

one or more peripherals coupled to the power supply distribution controller; and wherein the processor controls the power supply distribution controller to provide power to each of the one or more peripherals and to power down each of the one or more peripherals while power is provided to the processor.

11. The apparatus of claim 10, wherein the power supply distribution controller powers down each of the one or more peripherals based on inactivity of the peripheral for a predetermined amount of time.

12. The apparatus of claim 10, wherein the power supply distribution controller supplies power to at least one of the peripherals in a stand-by mode.

13. The apparatus of claim 10, wherein the power distribution controller is controlled to supply power to at least one of the peripherals based upon the occurrence of an event selected from the group consisting of: inactivity timeout, component activity, time based event, credit level threshold, mode transition to play mode, mode transition to attract mode and mode transition to diagnostic mode.

14. The apparatus of claim 10, wherein the processor controls the power distribution controller to stagger the power to the one or more peripherals from the power distribution controller.

15. A method comprising:

powering a processor from a primary power supply coupled to a power distribution source, the processor presenting a wagering game;

sending a first control signal to a secondary power supply coupled to the power distribution source;

providing power to one or more peripherals coupled to the secondary power supply upon receipt of the first control signal;

sending a second control signal to the secondary power supply while the processor is powered; and powering down the one or more peripherals upon receipt of the second control signal.

16. The method of claim 15, further comprising:

sending a third control signal to the secondary power supply while the processor is powered; and powering the at least one of the peripherals in a stand-by mode.

17. The method of claim 15, wherein the second control signal is sent based upon the occurrence of an event selected from the group consisting of: inactivity timeout, component activity, time based event, credit level threshold, mode transition to play mode, mode transition to attract mode and mode transition to diagnostic mode.

18. The method of claim 15, wherein the power is provided to the one or more peripherals by staggering power to each of the one or more peripherals.

* * * * *